(12) United States Patent
Bliznyuk

(10) Patent No.: US 10,150,171 B2
(45) Date of Patent: Dec. 11, 2018

(54) MITER SAW LINEAR MOVEMENT ASSEMBLY

(71) Applicant: Viktor Bliznyuk, Federal Way, WA (US)

(72) Inventor: Viktor Bliznyuk, Federal Way, WA (US)

( * ) Notice: Subject to any disclaimer, the term of this patent is extended or adjusted under 35 U.S.C. 154(b) by 0 days.

(21) Appl. No.: 15/423,819

(22) Filed: Feb. 3, 2017

(65) Prior Publication Data

US 2017/0232534 A1 Aug. 17, 2017

Related U.S. Application Data

(60) Provisional application No. 62/295,505, filed on Feb. 16, 2016.

(51) Int. Cl.
*B23D 45/04* (2006.01)
*B23D 47/02* (2006.01)

(52) U.S. Cl.
CPC .......... *B23D 45/048* (2013.01); *B23D 47/025* (2013.01)

(58) Field of Classification Search
CPC .... B23D 45/048; B23D 47/025; B23D 47/00; B27B 5/29; B27B 5/208; F16C 11/103; F16C 11/045; Y10T 16/05; Y10T 403/32614; Y10T 83/7693; Y10T 403/62; Y10T 83/7788; Y10T 16/537; Y10T 83/7697

USPC ..... 83/490, 471.3, 471.1, 483, 477.2, 471.2, 83/472, 477, 477.1, 487, 488, 489, 581, 83/486.1, 473

See application file for complete search history.

(56) References Cited

U.S. PATENT DOCUMENTS

| | | | | |
|---|---|---|---|---|
| 2,794,259 | A * | 6/1957 | Eschenbach | B43L 9/20 33/558.5 |
| 5,472,412 | A * | 12/1995 | Knoth | A61F 5/0123 428/111 |
| 6,892,618 | B2 | 5/2005 | Chin-Chin | |
| 8,499,672 | B2 | 8/2013 | Oberheim | |
| 8,628,062 | B2 * | 1/2014 | Alluru | B66F 3/12 254/122 |
| 8,631,734 | B2 | 1/2014 | Liu | |
| 9,844,822 | B2 * | 12/2017 | Cheng | B23D 47/02 |
| 2007/0186743 | A1 * | 8/2007 | Hardebeck | B23D 45/04 83/490 |

* cited by examiner

*Primary Examiner* — Ghassem Alie
(74) *Attorney, Agent, or Firm* — Timothy E. Siegel Patent Law, PLLC; Timothy E. Siegel

(57) ABSTRACT

A miter saw assembly is presented as a power tool, the miter saw assembly includes a base; a fixture supported on said base; a proximal pair of arms, hinged with four hinges to said fixture at a first hinge point; a gear box plate, hinged with four hinges to said proximal pair of arms at a second hinge point; a distal pair of arms, hinged with four hinges to said gear box at a first end, and a second end hinged with four hinges to said distal pair of arms; a gearing assembly hinged to said gear box plate, with a first gear attached to a first one of said proximal pair of arms and a second gear attached to a first one of said distal pair of arms, and a rotary saw, mounted to said second end of said distal pair of arms.

13 Claims, 3 Drawing Sheets

MITER SAW LINEAR MOVEMENT ASSEMBLY

RELATED APPLICATIONS

This application claims priority from provisional application No. 62/295,505, filed Feb. 16, 2016, which is hereby incorporated by reference as if fully set forth herein.

BACKGROUND OF THE INVENTION

The invention is generally in the field of power tools. More specifically, the invention is in the field of miter saw linear movement assemblies (LMAs). A miter saw includes a linear movement assembly to permit the circular blade to move along a vertical plane, and rigidly preventing sideways movement, as this could cause the rapidly rotating blade to contact the sides of the slot in the work piece support, with potentially disastrous results.

Currently available LMAs typically have many shortcomings. The most common type of LMA is the sliding mechanism, wherein a set of rods moves in and out of a set of rod receptacles to move the saw along a rigid linear path. The sliding mechanism takes up a lot of volume behind the saw, causing the entire miter saw assembly to take up an undesirably large volume of space. In a cramped workshop, this may be a real problem.

Moreover, the air in a workshop in which a miter saw is used tends to become thick with saw dust, so that sliding mechanism regularly fills up with detritus, making the inside components grind together. This results in the sliding mechanism jamming up, which is a dangerous condition, and increases the frequency at which the LMA must be serviced.

SUMMARY OF THE INVENTION

The present invention linearly moves the cutting component of the miter saw, while not using the volume behind the saw. The mechanism is attached to the base of the miter saw. The mechanism uses gears to compress the arm of the miter saw, keeping the cutting component moving in a linear fashion. The mechanism is reliable and when the arm is fully extended, it remains sturdy.

In a first separate aspect, the present invention may take the form of a miter saw assembly. The assembly includes a base; a fixture supported on said base; a proximal pair of arms, hinged with four hinges to said fixture at a first hinge point; a gear box plate, hinged with four hinges to said proximal pair of arms at a second hinge point; a distal pair of arms, hinged with four hinges to said gear box at a first end, and a second end hinged with four hinges to said distal pair of arms; a gearing assembly hinged to said gear box plate, with a first gear attached to a first one of said proximal pair of arms and a second gear attached to a first one of said distal pair of arms, and a rotary saw, mounted to said second end of said distal pair of arms.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE INVENTION

Figure 1:
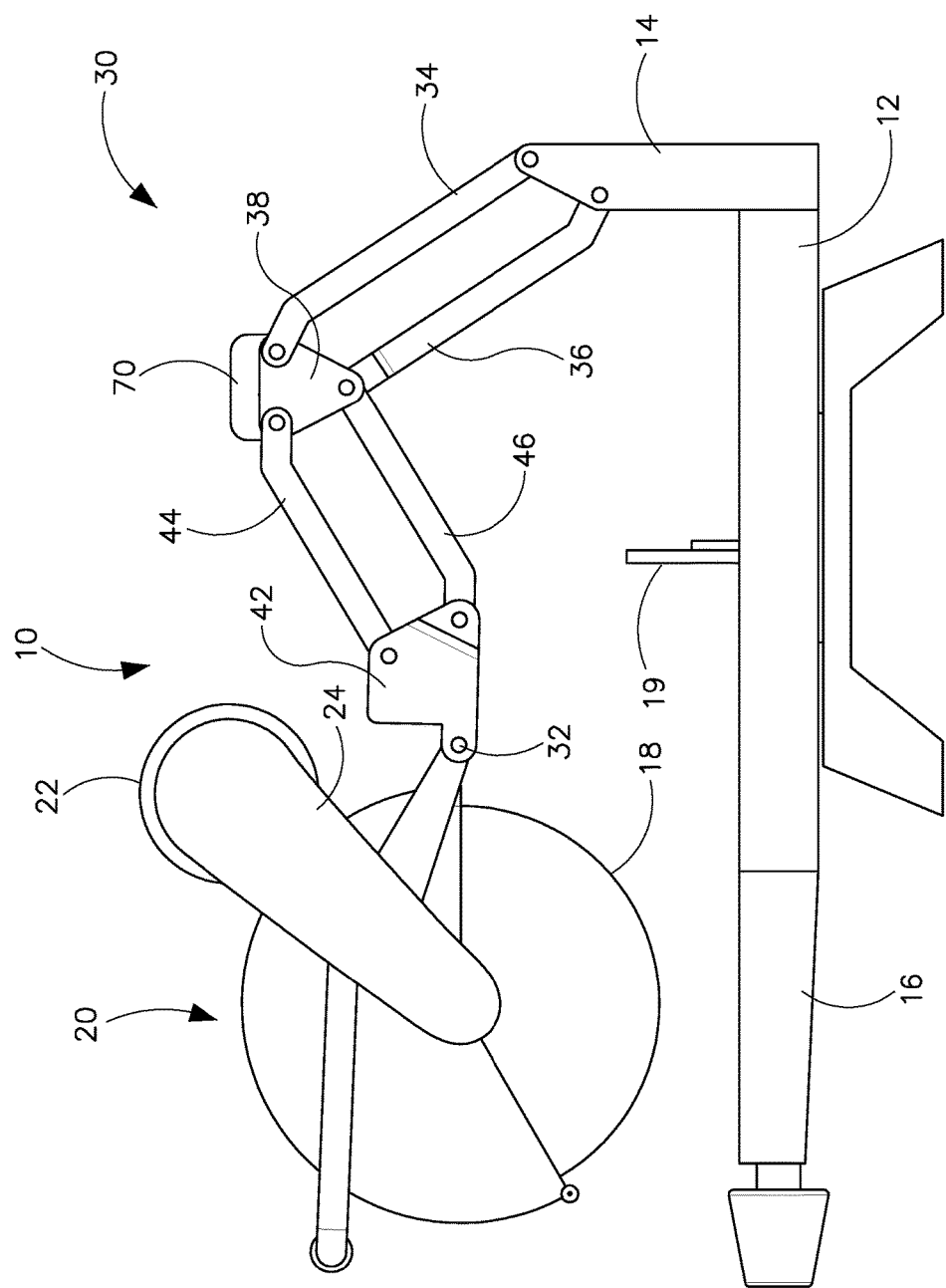
FIG. 1 is an isometric view of a miter saw assembly, including a linear movement assembly.

Referring to FIG. 1, a miter saw assembly 10 includes a base 12 supporting a bracket 14 and work piece support 16, defining a slot (not shown) to accommodate a circular saw blade 18, as it saws through a work piece. A horizontal blocking element 19 (also with a cleft to accommodate the blade) constrains a work piece horizontally, during sawing. The circular saw blade 18 is part of a rotary saw sub-assembly 20, which further includes an electric motor 22 and a drive mechanism 24 (with only the belt cover shown). A linear movement assembly (LMA) 30 is mounted on bracket 14 and is connected to circular saw sub-assembly at hinge 32.

Figure 2:
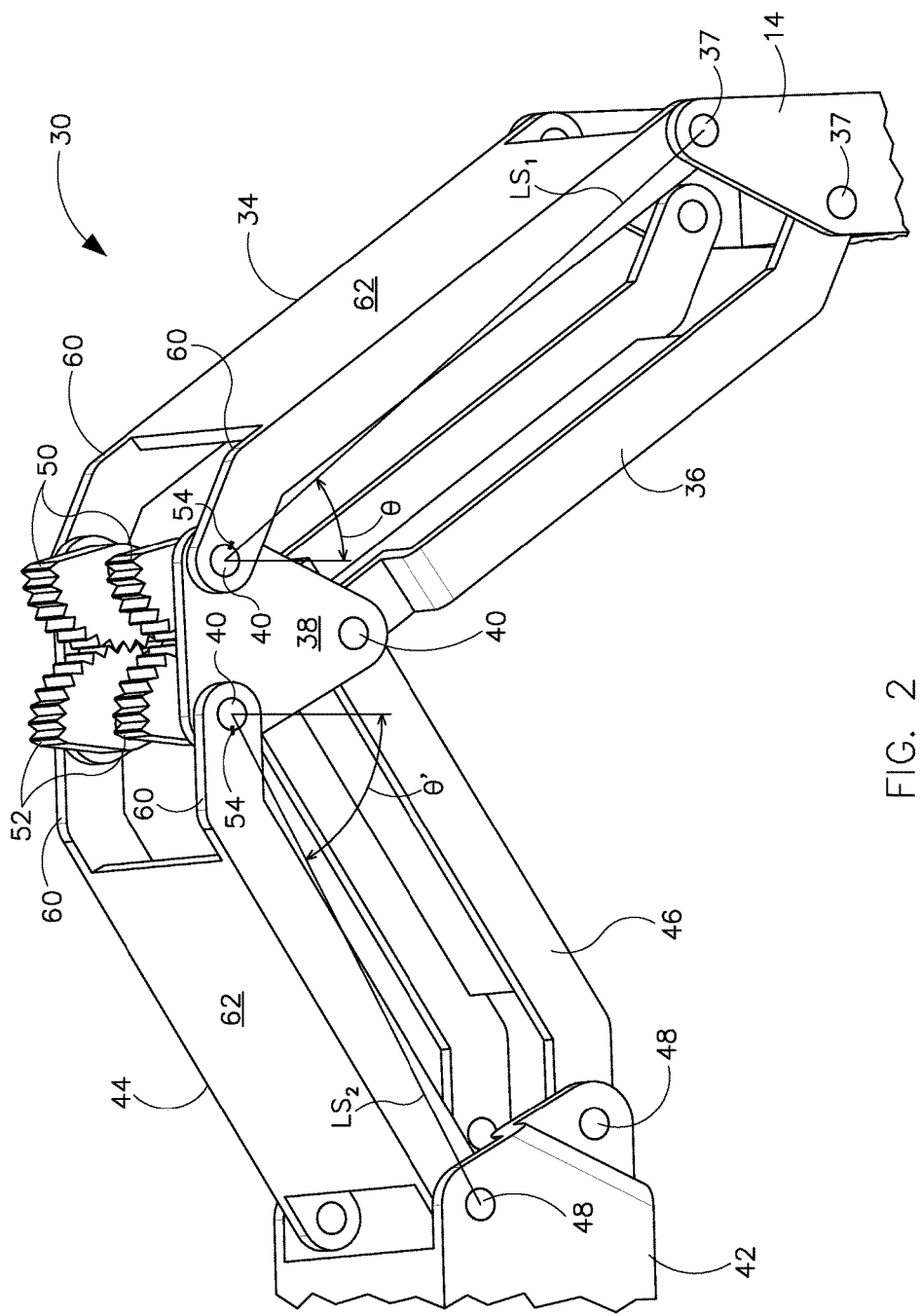
FIG. 2 is a side view of the linear movement assembly of FIG. 1.

Referring to FIG. 2, now, in addition to FIG. 1, a proximal pair of arms, including a proximal upper arm 34 and a proximal lower arm 36, are hinged to bracket 14 at hinges 37 and to a gearbox plate 38, at hinges 40. Arms 34 and 36 are shaped and arranged so that as they rotate about their respective hinges 37, gearbox plate 38 maintains an unchanging orientation as it moves in an essentially arcuate manner. A second gearbox plate (not shown) is displaced horizontally from gearbox plate 38, with a gearing assembly (described below) located in between second gearbox plate and gearbox plate 38. A distal pair of arms 44 and 46 are connected between gearbox plate 38 and an end bracket 42, and are hinged to gearbox plate 38 at hinges 40, and to bracket 42 (which terminates at hinge 32, connecting to the miter saw assembly 20) at hinges 48. The rotary saw sub-assembly 20 is mounted on the end of the distal pair of arms by being hinged to bracket 42 that is hinged to each end of each distal arm 44 and 46.

A pair of gears, 50 and 52, are rigidly attached, by way of splines 54, to upper arms 34 and 44, respectively, so that the angle relationship between arms 34 and 44 is set by the gears 50 and 52, as arms 34 and 44 rotate through their arcs. In order to keep bracket 42 at a constant vertical position, the angle θ' between vertical and a line segment $LS_2$ must obey the following equation:

$$\theta' = \text{Arccos}\left(\frac{l\cos\theta - h}{l'}\right)$$

Where θ is the angle between vertical and line segment $LS_1$, l is the length of line segment $LS_1$, l' is the length of line segment $LS_2$, and his the vertical position difference between the proximal uppermost hinge 37 and the distal uppermost hinge 48. If l equals l', and h=0, this equation reduces to θ'=θ. In one embodiment his set to equal (l–l').

This embodiment, in which the proximal and distal arms match, may have a set of matching, circular toothed gears. If the arms are of unequal length, however, the gears cannot be circular. in order to have a correct gearing relationship, in one embodiment the gears do not have teeth, as shown, but have non-slip surfaces. In another embodiment in which l does not equal l', gears 50 and 52 are toothed gears, but are constructed to have the required relationship.

Two of the arms (34 and 44) include a horizontally spaced pair of lengthwise elements 60, joined together by a plate 62. The lengthwise elements 60 are individually hinged to one of the brackets 14 or 42. Two of the arms may have a width of at least 10 cm. Additionally; two of the arms 34 and 44 have a width of at least 15 cm.

Figure 3:
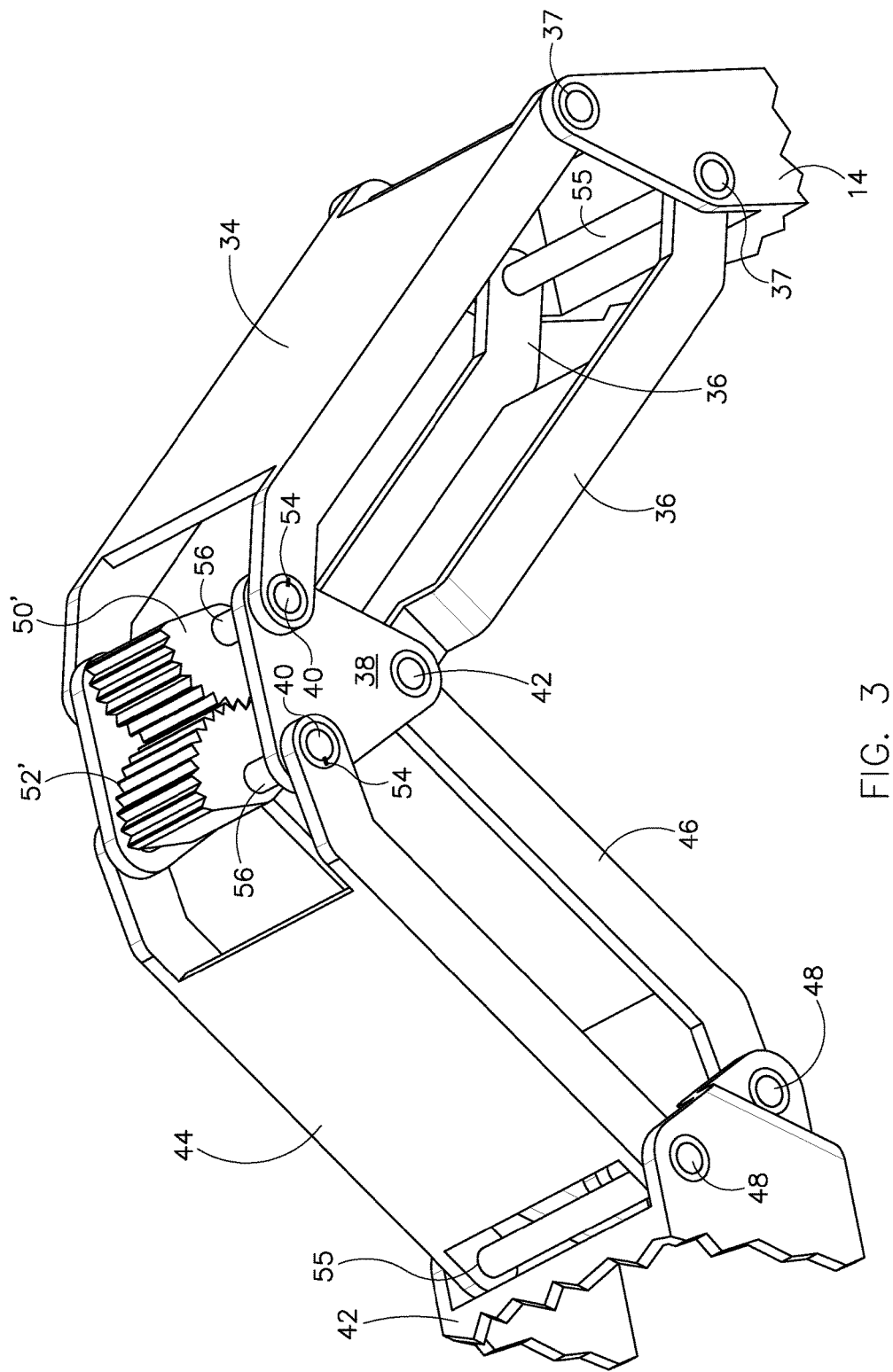
FIG. 3 is a side view of an alternate embodiment of a linear movement assembly, that could be used in the miter saw assembly of FIG. 1.

Referring to FIG. 3, in an alternative embodiment, axles 55 and 56 are added and gears 50' and 52' replace gears 50 and 52.

Referring, again, to FIG. 1 in a preferred embodiment a cover 70 protects gears 50 and 52 from saw dust and dirt. Additional housing features may also be used to protect gears 50 and 52 from saw dust and dirt. Although the linear movement assembly 30 is shown as being vertically hinged, with elements moving vertically, as well as in the direction of linear movement of the rotary saw sub-assembly 20, in an alternative preferred embodiment, the elements are hinged horizontally, in a dimension orthogonal to the direction of linear movement.

The invention claimed is:

1. A miter saw assembly, comprising:
   (a) a base;
   (b) a fixture supported on said base;
   (c) a proximal pair of arms, having a first length, and hinged to said fixture at a pair of first hinges, such that said proximal pair of arms can swing through a movement plane and having a second pair of hinges opposed to said first pair of hinges;
   (d) a gear box plate hinged in said first dimension to said proximal pair of arms at said second hinge points, and wherein said proximal pair of arms are shaped, said first pair of hinges are positioned on said fixture, and said second hinges are positioned on said gear box plate, such that said gear box plate does not change orientation as said gear box plate is moved about said fixture;
   (e) a distal pair of arms, having a second length, and shaped and hinged to said gear box plate at a first end, and having a second end, opposed to said first end;
   (f) a rotary saw sub-assembly, mounted to said second end of said distal pair of arms;
   (g) a gearing assembly hinged to said gear box plate, but having a first gear rigidly attached to a first one of said proximal pair of arms and a second gear, engaged to said first gear, and rigidly attached to a first one of said distal pair of arms, so that said rotary saw sub-assembly is permitted to move in a first dimension of said movement plane, but remains stationary in a second dimension, orthogonal to said first dimension, as the rotary saw sub-assembly moves through said first dimension.

2. The miter saw assembly of claim 1, wherein said gearing assembly causes the angle of said first one of said distal pair of arms, as defined by its hinge-to-hinge line segment, relative to said first dimension, to equal:

$$\mathrm{Arccos}\left(\frac{l\cos\theta - h}{l'}\right)$$

where l is the proximal arm length, l' is the distal arm length, both defined as length from hinge-to-hinge, θ is the angle of the first one of said proximal pair of arms, relative to said first dimension, and h is the difference in position, in said first dimension, between said fixture and said rotary saw subassembly, divided by the distal arm length.

3. The miter saw assembly of claim 1, wherein said first dimension is vertical.

4. The miter saw assembly of claim 1, wherein said rotary saw sub-assembly is mounted on said end of said distal pair of arms, including a horizontally spaced pair of lengthwise elements, by being hinged to a rotary saw fixture that is hinged to each of said second ends of said distal pair of arms.

5. The miter saw assembly of claim 4, wherein said lengthwise elements of said at least one of said pair of distal arms is hinged to said rotary saw fixture by a rod that extends through each lengthwise element of an arm.

6. The miter saw assembly of claim 1, further including a second gear box plate, displaced horizontally from said gear box plate, and wherein said gearing assembly is supported between said gear box plate and said second gear box plate.

7. The miter saw assembly of claim 1, where at least two of said arms include a pair of lengthwise elements, spaced transversely relative to length of said arms, and joined together by a transversely-extending plate.

8. The miter saw assembly of claim 7, wherein said at least two of said arms have a width of at least 10 cm.

9. The miter saw assembly of claim 7, wherein said at least two of said arms have a width of at least 15 cm.

10. The miter saw assembly of claim 7, wherein said lengthwise elements of said at least two of said arms are individually hinged to said fixture.

11. The miter saw assembly of claim 1, wherein said distal arms and said proximal arms are the same length, and wherein said first gear and said second gear are mutually equal, so that the angle of said distal pair of arms, relative to said first dimension, equals that of said proximal pair of arms, relative to said first dimension.

12. The miter saw assembly of claim 1, further including a work piece support, supported by said base.

13. The miter saw assembly of claim 1, wherein said proximal and distal arms are mirror images of each other, and the gears have a consistent 1:1 ratio.

\* \* \* \* \*